United States Patent
Puthoor et al.

(10) Patent No.: US 11,934,827 B2
(45) Date of Patent: Mar. 19, 2024

(54) PARTITION AND ISOLATION OF A PROCESSING-IN-MEMORY (PIM) DEVICE

(71) Applicant: ADVANCED MICRO DEVICES, INC., Santa Clara, CA (US)

(72) Inventors: Sooraj Puthoor, Austin, TX (US); Muhammad Amber Hassaan, San Marcos, TX (US); Ashwin Aji, Santa Clara, CA (US); Michael L. Chu, Santa Clara, CA (US); Nuwan Jayasena, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 50 days.

(21) Appl. No.: 17/556,291

(22) Filed: Dec. 20, 2021

(65) Prior Publication Data

US 2023/0195459 A1 Jun. 22, 2023

(51) Int. Cl.
*G06F 9/30* (2018.01)
*G06F 7/575* (2006.01)
*G06F 9/38* (2018.01)

(52) U.S. Cl.
CPC ............ *G06F 9/3004* (2013.01); *G06F 7/575* (2013.01); *G06F 9/3001* (2013.01); *G06F 9/3856* (2023.08)

(58) Field of Classification Search
CPC ...... G06F 9/3004; G06F 7/575; G06F 9/3001; G06F 9/3855; G06F 9/3856; G06F 9/30043; G06F 9/30076; G06F 9/3877; G06F 9/46; G06F 9/4843; G06F 9/485; G06F 15/785
See application file for complete search history.

(56) References Cited

U.S. PATENT DOCUMENTS

| | | | |
|---|---|---|---|
| 6,233,668 B1 * | 5/2001 | Harvey | G06F 12/1009 711/147 |
| 6,725,456 B1 * | 4/2004 | Bruno | G06F 9/5011 |
| 6,851,059 B1 * | 2/2005 | Pfister | H04L 63/06 710/39 |
| 8,738,860 B1 | 5/2014 | Griffin et al. | |
| 2010/0023941 A1 | 1/2010 | Iwamatsu et al. | |
| 2014/0237261 A1 | 8/2014 | Diep et al. | |
| 2017/0048358 A1 | 2/2017 | Roberts et al. | |
| 2018/0089081 A1 | 3/2018 | Ramalingam | |
| 2019/0018777 A1 * | 1/2019 | Swaine | G06F 12/1036 |
| 2019/0066761 A1 * | 2/2019 | Lea | G06F 3/0673 |
| 2019/0079677 A1 | 3/2019 | Malladi et al. | |

(Continued)

OTHER PUBLICATIONS

"Silent-PIM: Realizing the Processing-in-Memory Computing With Standard Memory Requests,", Kim et al, Published Mar. 11, 2021 (Year: 2021).*

(Continued)

*Primary Examiner* — Farley Abad (57) ABSTRACT

An apparatus that manages multi-process execution in a processing-in-memory ("PIM") device includes a gatekeeper configured to: receive an identification of one or more registered PIM processes; receive, from a process, a memory request that includes a PIM command; if the requesting process is a registered PIM process and another registered PIM process is active on the PIM device, perform a context switch of PIM state between the registered PIM processes; and issue the PIM command of the requesting process to the PIM device.

20 Claims, 6 Drawing Sheets

(56) References Cited

U.S. PATENT DOCUMENTS

2023/0195645 A1    6/2023  Puthoor et al.

OTHER PUBLICATIONS

Kim et al., "Silent-PIM: Realizing the Processing-in-Memory Computing With Standard Memory Requests," IEEE Transactions on Parallel and Distributed Systems, vol. 33, No. 2, Feb. 2022, Date of Publication: Mar. 11, 2021, DOI: 10.1109/TPDS.2021.3065365, pp. 251-262.
Gao, et al., "Practical Near-Data Processing for In-memory Analytics Frameworks," 2015 International Conference on Parallel Architecture and Compilation (PACT), Oct. 2015, IEEE, San Francisco, CA, 12 pages.
Hajj et al., "SpaceJMP: Programming with Multiple Virtual Address Spaces," ACM SIGPLAN Notices, vol. 51, Issue 4, Apr. 2016, https://doi.org/10.1145/2954679.2872366, 16 pages.
Hall et al., "Memory Management in PIM-Based Architecture," In: Chong et al., "Intelligent Memory Systems," IMS 2000, Lecture Notes in Computer Science, vol. 2107, Springer, Berlin, Heidelberg, https://doi.org/10.1007/3-540-44570-6_7, Published Sep. 5, 2001, 23 pages.
Hori, et al., "Process-in-Process: Techniques for Practical Address-Space Sharing," Proceedings of the 27th International Symposium on High-Performance Parallel and Distributed Computing, Jun. 11-15, 2018, Tempe, AZ, USA, https://doi.org/10.1145/3208040.3208045, Published: Jun. 11, 2018, 13 pages.

\* cited by examiner

PARTITION AND ISOLATION OF A PROCESSING-IN-MEMORY (PIM) DEVICE

BACKGROUND

Computing systems often include a number of processing resources, such as processors or processor cores, which can retrieve instructions, execute instructions, and store the results of executed instructions to memory. A processing resource can include a number of functional units such as arithmetic logic units (ALUs), floating point units (FPUs), and combinatorial logic blocks, among others. Typically, such functional units are local to the processing resources. That is, functional units tend to be implemented as part of a processor and are separate from memory devices in which data to be operated upon is retrieved and data forming the results of operations is stored. Such data can be accessed via a bus between the processing resources and memory.

Processing performance can be improved by offloading operations that would normally be executed in the functional units to a processing-in-memory (PIM) device. PIM refers to an integration of compute and memory for execution of instructions that would otherwise be executed by a computer system's primary processor or processor cores. In some implementations, PIM devices incorporate both memory and functional units in a single component or chip. Although PIM is often implemented as processing that is incorporated 'in' memory, this specification does not limit PIM so. Instead, PIM may also include so-called processing-near-memory implementations and other accelerator architectures. That is, the term 'PIM' as used in this specification refers to any integration—whether in a single chip or separate chips—of compute and memory for execution of instructions that would otherwise be executed by a computer system's primary processor or processor core. In this way, instructions executed in a PIM architecture are executed 'closer' to the memory accessed in executing the instruction. A PIM device can therefore save time by reducing or eliminating external communications and can also conserve power that would otherwise be necessary to process memory communications between the processor and the memory.

DETAILED DESCRIPTION

As mentioned above, PIM architectures support operations to be performed in, at, or near to the memory module storing the data on which the operations are performed on or with. Such an architectures allows for improved computational efficiency through reduced data transfer as well as reduced power consumption. In some implementations, a PIM architecture supports offloading instructions from a host processor for execution in memory or near memory, such that bandwidth on the data link between the processor and the memory is conserved and power consumption of the processor is reduced. The execution of PIM instructions by a PIM device does not require loading data into local CPU/GPU registers and writing data from local CPU/GPU storage back to the memory. In fact, any processing element that is coupled to memory for execution of operations can benefit from PIM device execution.

Such a host processor often supports multi-processing where multiple processes of the same or different applications are executed in parallel. In such a multi-processing environment, however, without protection, two or more processes can simultaneously access a shared PIM resource in a manner that results in functional incorrectness or security vulnerability. Concurrent access can result in functional incorrectness when, for example, two processes access the same PIM register. For example, assume process "A" loaded instructions into a PIM's local instruction store. During process A's PIM execution, suppose another process such as, for example, process "B" modifies this local instruction store. Process A's PIM code is then corrupted, and process A's PIM execution will return incorrect results. Similarly, process B can also access PIM registers by sending PIM memory operations and can corrupt the PIM register state as well, resulting in incorrect PIM phase execution of process A.

Additionally, such simultaneous access can also result in security vulnerabilities such as, for example, by creating a side channel via PIM registers. For example, if process B is malicious, process B can create a side channel via PIM registers by sending PIM memory operations that can leak PIM register information of process A into its own address space.

Accordingly, implementations in accordance with the present disclosure provide hardware support and resource management techniques for partitioning and isolating a PIM device. That is, the various implementations provide for spatiotemporal partitioning (both time and space partitioning) of PIM using a gatekeeper (e.g., a PIM agent) and context switching. Each PIM unit can execute multiple processes as allowed and monitored by the gatekeeper. For explanation, in the description below, a "PIM offload instruction" is executed by a processor core, a "PIM command" is generated and issued to a PIM device as a result of executing the PIM offload instruction, and a "PIM instruction" is executed by the PIM device.

Implementations in accordance with the present disclosure prevent corruption of PIM configuration space, including a local instruction store (LIS) that stores PIM instructions for execution, PIM configuration registers, and the like. The LIS component stores the PIM instructions that will be executed on the PIM device. PIM orchestration operations are isolated by allowing and restricting only one process to orchestrate a PIM device or set of PIM devices resources at a time. It should also be noted that PIM memory/units has two distinct spaces; 1) a PIM configuration space used for configuring the PIM before the PIM operation, and 2) a PIM orchestration space, which is used to orchestrate execution of PIM operations.

In one aspect, a PIM device can also be a PIM unit and "device," or "unit" can be used interchangeably. In one aspect, as used herein "orchestrate" refers to the planning, coordinating, configuration and managing of each operation related to a PIM. While examples in this disclosure discuss the applicability of the implementations to PIM technology, such examples should not be construed as limiting.

In an implementation, an apparatus is configured for managing multi-process execution in a PIM device. The apparatus includes a gatekeeper and the gatekeeper includes logic configure to carry out receiving an identification of one or more registered PIM processes, receiving, from a process, a memory request that includes a PIM command, performing a context switch of PIM state between the registered PIM processes, and issuing the PIM command of the requesting process to the PIM device.

In an implementation, the gatekeeper also includes logic configured to carry out: issuing the PIM command to the PIM device without performing a context switch of PIM state if the requesting process is a registered PIM process and the requesting process is active on the PIM device. In an implementation, the gatekeeper also includes logic configured to carry out dropping the memory request if the requesting process is not a registered PIM process.

In an implementation, the gatekeeper also includes logic configured to carry out queuing the memory request prior to performing the context switch of PIM state between the registered PIM processes. The gatekeeper, in an implementation, queues the memory request for a predefined period of time before performing the context switch. The gatekeeper in an implementation also includes logic to reorder and batch queued memory requests from a same process prior to performing the context switch.

In an implementation, the memory request is encoded with an identification of the requesting process, and the gatekeeper includes logic to determine based on the identification of the requesting process whether another registered PIM process is active on the PIM device.

In an implementation, the gatekeeper further comprises a memory controller. In another implementation, the gatekeeper comprises a PIM agent that is a microcontroller. In an implementation where the gatekeeper is a memory controller, the memory controller is further configured to carry out processing non-PIM memory requests concurrently with memory requests that include a PIM command.

In an implementation, the apparatus further comprising computer program instructions, such as a PIM driver, that, when executed, perform the following: receiving from each of a plurality of processes, a request to register as a PIM process, wherein each request includes an identifier of the requesting process, registering the processes, including storing the received identifiers, and providing the stored identifiers of the registered PIM processes to the gatekeeper.

Also described in this specification are methods of managing multi-process execution in a PIM device. In an implementation, the method includes: receiving an identification of one or more registered PIM processes, receiving, from a process, a memory request that includes a PIM command, if the requesting process is a registered PIM process and another registered PIM process is active on the PIM device, performing a context switch of PIM state between the registered PIM processes, and issuing the PIM command of the requesting process to the PIM device.

In an implementation, the method also includes issuing the PIM command to the PIM device, without performing a context switch of PIM state if the requesting process is a registered PIM process and the requesting process is active on the PIM device. In an implementation, the method also includes dropping the memory request if the requesting process is not a registered PIM process.

In an implementation, the method includes queuing the memory request prior to performing the context switch of PIM state between the registered PIM processes. In an implementation, the memory request is queued for a predefined period of time before performing the context switch. In an implementation, the queued memory requests of a same process are reordered and batched prior to performing the context switch.

In an implementation, the memory request is encoded with an identification of the requesting process, and the method also includes determining, based on the identification of the requesting process encoded in the memory request, whether another registered PIM process is active on the PIM device.

In an implementation, the method includes processing non-PIM memory requests concurrently with memory requests that include a PIM command. In an implementation, the method of claim also includes: receiving from each of a plurality of processes, a request to register as a PIM process, where each request includes an identifier of the requesting process, registering the processes, including storing the received identifiers, and providing the stored identifiers of the registered PIM processes to the gatekeeper.

Figure 1:
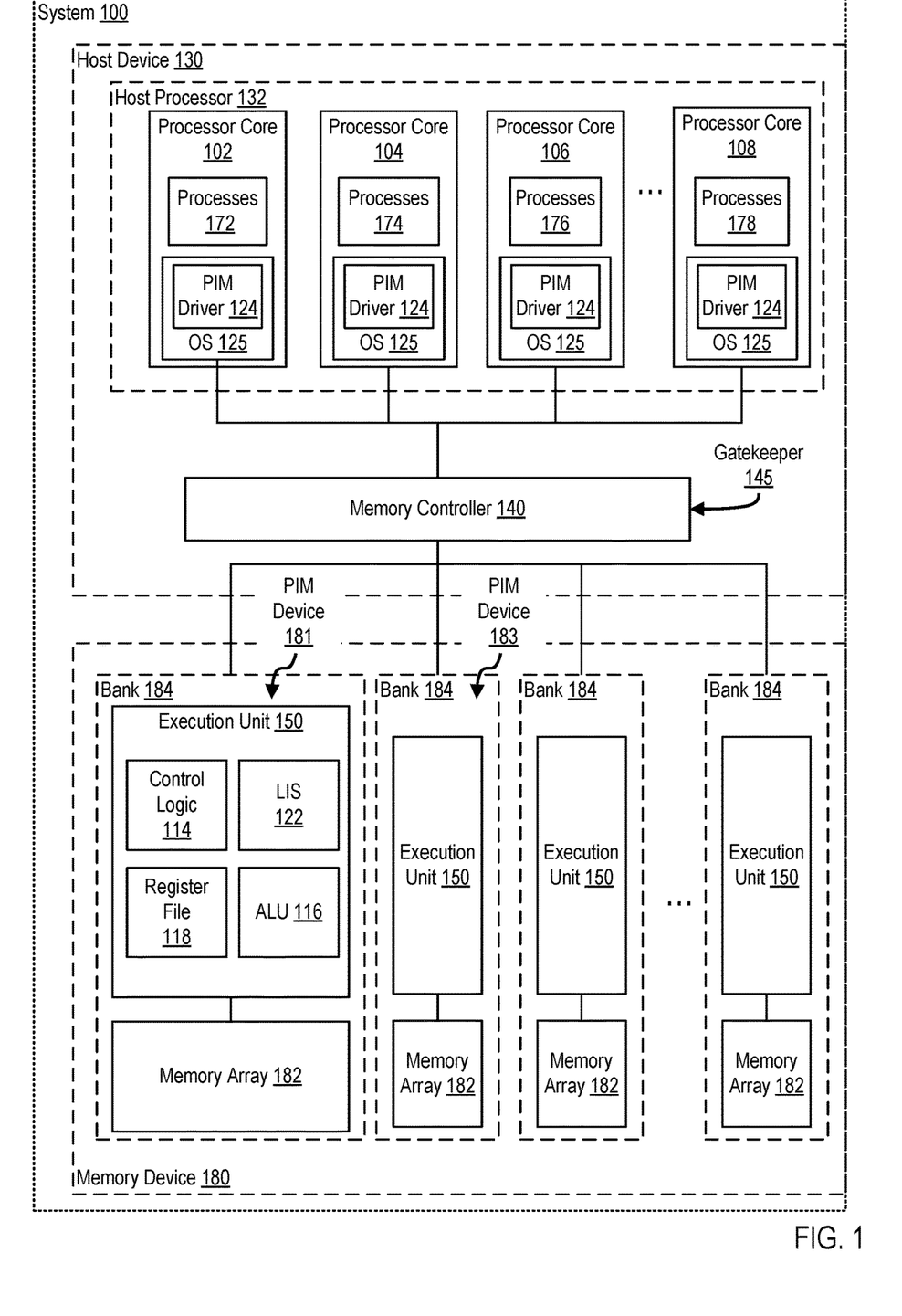
FIG. 1 sets forth a block diagram of an example system 100 for process isolation for a PIM device in accordance with the present disclosure.

Implementations in accordance with the present disclosure will be described in further detail beginning with FIG. 1. Like reference numerals refer to like elements throughout the specification and drawings. FIG. 1 sets forth a block diagram of an example system 100 for process isolation for a PIM device in accordance with the present disclosure.

The example system 100 of FIG. 1 includes a host device 130 including a processor 132 that includes one or more processor cores 102, 104, 106, 108. While four processor cores are depicted in FIG. 1, it should be understood that the host device 130 can include more or fewer processor cores than depicted. In various examples, the processor cores 102, 104, 106, 108 are CPU cores, GPU cores, or APU cores of the host device 130. In various examples, the processor cores 102, 104, 106, 108 operate as PIM control engines.

A GPU is a graphics and video rendering device for computers, workstations, game consoles, and similar digital processing devices. A GPU is generally implemented as a co-processor component to the CPU of a computer. The GPU can be discrete or integrated. For example, the GPU can be provided in the form of an add-in card (e.g., video card), stand-alone co-processor, or as functionality that is integrated directly into the motherboard of the computer or into other devices.

The phrase accelerated processing unit ("APU") is considered to be a broad expression. The term 'APU' refers to any cooperating collection of hardware and/or software that performs those functions and computations associated with accelerating graphics processing tasks, data parallel tasks, nested data parallel tasks in an accelerated manner compared to conventional CPUs, conventional GPUs, software and/or combinations thereof. For example, an APU is a processing unit (e.g., processing chip/device) that can function both as a central processing unit ("CPU") and a graphics processing unit ("GPU"). An APU can be a chip that includes additional processing capabilities used to accelerate one or more types of computations outside of a general-purpose CPU. In one implementation, an APU can include a general-purpose CPU integrated on a same die with a GPU, a FPGA, machine learning processors, digital signal processors (DSPs), and audio/sound processors, or other processing unit, thus improving data transfer rates between these units while reducing power consumption. In some implementations, an APU can include video processing and other application-specific accelerators.

It should be noted that the terms processing in memory (PIM), processing near-memory (PNM), or processing in or near-memory (PINM), all refer a device (or unit) which includes a non-transitory computer readable memory device, such as dynamic random access memory (DRAM), and one or more processing elements. The memory and processing elements can be located on the same chip, within the same package, or can otherwise be tightly coupled. For example, a PNM device could include a stacked memory having several memory layers stacked on a base die, where the base die includes a processing device that provides near-memory processing capabilities.

The host device 130 of FIG. 1 is configured to host multi-process execution. For example, each processor core 102, 104, 106, 108 of the host device 130 executes a different process 172, 174, 176, 178 of the same or different application.

In an implementation, the processor cores 102, 104, 106, 108 operate according to an extended instruction set architecture (ISA) that includes explicit support for PIM offload instructions that are offloaded to a PIM device for execution. Examples of PIM offload instruction include a PIM Load and PIM Store instruction among others. In another implementation, the processor cores operate according to an ISA that does not expressly include support for PIM offload instructions. In such an implementation, a PIM driver, hypervisor, or operating system provides an ability for a process to allocate a virtual memory address range that is utilized exclusively for PIM offload instructions. An instruction referencing a location within the aperture will be identified as a PIM offload instruction.

In the implementation in which the processor cores operate according to an extended ISA that explicitly supports PIM offload instructions, a PIM offload instruction is completed by the processor cores 102, 104, 106, 108 when virtual and physical memory addresses associated with the PIM instruction are generated, operand values in processor registers become available, and memory consistency checks have completed. The operation (e.g., load, store, add, multiply) indicated in the PIM offload instruction is not executed on the processor core and is instead offloaded for execution on the PIM device. Once the PIM offload instruction is complete in the processor core, the processor core issues a PIM command, operand values, memory addresses, and other metadata to the PIM device. In this way, the workload on the processor cores 102, 104, 106, 108 is alleviated by offloading an operation for execution on a device external to or remote from the processor cores 102, 104, 106, 108.

The memory addresses of a PIM command refers to, among other things, an entry in a local instruction store (LIS) 122 that stores a PIM instruction that is to be executed by at least one PIM device 181. In the example of FIG. 1, the PIM device 181 is an execution unit 150 that is external to the processor 132 and processor cores 102, 104, 106, 108. In one example, the execution unit includes control logic 114 for decoding instructions or commands issued from the processor cores 102, 104, 106, 108, an arithmetic logic unit (ALU) 116 that performs an operation indicated in the PIM instructions or command, and a register file 118 including a plurality of indexed registers for holding data for load/store operations to memory or intermediate values of ALU computations. In some examples, the ALU 116 is capable performing a limited set of operations relative to the ALUs of the processor cores 102, 104, 106, 108, thus making the ALU 116 less complex to implement and, for example, more suited for an in-memory implementation.

A PIM instruction can move data between the registers and memory, and it can also trigger computation on this data in the ALU 116. In some examples, the execution unit also includes a LIS 122 that stores commands of PIM instructions written into the LIS by the host processor 132. In these examples, the PIM instructions include a pointer to an index in the LIS 122 that includes the operations to be executed in response to receiving the PIM instruction. For example, the LIS 122 holds the actual opcodes and operands of each PIM instruction.

The execution unit 150 is a PIM device 181 that is included in a PIM-enabled memory device 180 (e.g., a remote memory device) having one or more DRAM arrays. In such an implementation, PIM instructions direct the PIM device 181 to execute an operation on data stored in the PIM-enabled memory device 180. For example, operators of PIM instructions include load, store, and arithmetic operators, and operands of PIM instructions can include architected PIM registers, memory addresses, and values from core registers or other core-computed values. The ISA can define the set of architected PIM registers (e.g., eight indexed registers).

In some examples, there is one execution unit per DRAM component (e.g., bank, channel, chip, rank, module, die, etc.), thus the PIM-enabled memory device 180 include multiple execution units 150 that are PIM devices. PIM commands issued from the processor cores 102, 104, 106, 108 can access data from DRAM by opening/closing rows and reading/writing columns (like conventional DRAM commands do). In some implementations, the host processor 132 issues PIM commands to the ALU 116 of each execution unit 150. In implementations with a LIS 122, the host processor 132 issues commands that include an index into a line of the LIS holding the PIM instruction to be executed by the ALU 116. In these implementations with a LIS 122, the host-memory interface does not require modification with additional command pins to cover all the possible opcodes needed for PIM. Each PIM command carries a target address that is used to direct it to the appropriate PIM unit(s) as well as the PIM instruction to be performed. An execution unit 150 can operate on a distinct subset of the physical address space. When a PIM command reaches the execution unit 150, it is serialized with other PIM commands and memory accesses to DRAM targeting the same subset of the physical address space.

The execution unit 150 is characterized by faster access to data relative to the host processor 132. The execution unit 150 operates at the direction of the processor cores 102, 104, 106, 108 to execute memory intensive tasks. In the example of FIG. 1, the execution unit 150 is implemented within a memory partition and is coupled to a memory array 182. The memory array 182 can be one or more arrays of memory cells of a bank, channel, or other memory hierarchy partition. Without loss of generality, when discussing execution units 150 as PIM devices, it is assumed that each execution unit is coupled to a respective memory bank 184 that includes the memory array 182. Readers of skill in the art will appreciate that various configurations of PIM devices and memory partitions (physical or logical) in a PIM-enabled memory device can be employed without departing from the spirit of the present disclosure. The PIM-enabled memory devices can be memory devices such a double data rate (DDRx) memory device, graphics DDRx (GDDRx) memory device, low power DDRx (LPDDRx) memory device, high bandwidth memory (HBM) device, hybrid memory cube (HMC) device, Non-Volatile Random-Access Memory (NV-RAM) device, or other memory device that supports PIM.

The host device 130 also includes at least one memory controller 140 that is shared by the processor cores 102, 104, 106, 108 for accessing a channel of the PIM-enabled memory device 180. In some implementations, the host device 130 can include multiple memory controllers, each corresponding to a different memory channel in the PIM-enabled memory device 180. In some examples, the memory controller 140 is also used by the processor cores 102, 104, 106, 108 for executing one or more processes 172, 174, 176, and 178 and offloading PIM instructions for execution by the execution unit 150.

The memory controller 140 maintains one or more dispatch queues for queuing commands to be dispatched to a memory channel or other memory partition. Stored in memory and executed by the processor cores 102, 104, 106, 108 is an operating system 125 and a PIM driver 124.

In an implementation, the PIM Driver 124 aids in managing multi-process execution in the PIM devices 181, 183. Process 172, 174, 176, 178 can request from the PIM driver registration as a PIM process. To do so, a process provides a process identifier (PID) to the PIM driver 124 through a driver call. The PIM driver 124 registers the process as a PIM process by storing the PID and providing the PID to a gatekeeper. A gatekeeper 145 is logic that is configured to carry out the management of multi-process execution in PIM devices according to aspects of the present disclosure. In the example of FIG. 1, the gatekeeper 145 is a memory controller 140.

The memory controller 140 receives identifications of the registered PIM processes from the PIM driver 124. When the memory controller receives a memory request that includes a PIM command from a process, the memory controller determines whether the requesting process is a registered PIM process. The memory request is encoded with the PID of the requesting process. The memory controller compares the PID encoded in the memory request to the registered PIM process IDs received from the PIM driver to determine whether the requesting process is a registered PIM process.

If the requesting process is not a registered PIM process, the request is dropped. That is, the memory controller does not process the memory request, effectively blocking any non-registered process from access PIM resources. A non-registered process can attempt to access PIM device resources for a variety of reasons. For example, a non-registered process can attempt to access PIM device resources due to an error in the process's code or in some cases, because the process is a malicious process attempting to circumvent security.

In addition to the registered PIM PIDs, the memory controller also maintains a value for an active PIM process. An active PIM process is a process—the only process—authorized at the moment to access a set of PIM resources and execute PIM instructions on a PIM device. The memory controller can store a PID of a registered PIM process in a register configured for the purpose of storing an identifier of the active PIM process.

If the requesting process is a registered PIM process and is the active PIM process, the memory controller processes the memory request. That is, memory requests from the active PIM process are processed and the memory controller issues the PIM command of the memory request to the PIM device where the command will be utilized to identify one or more PIM instructions as well as memory locations containing data to be operated on or utilized in operation of the PIM instructions.

If the requesting process is a registered PIM process and another registered PIM process is active on the PIM device, then the gatekeeper 145 performs a context switch of PIM state between the registered PIM processes. The PIM state that is subject to the context switch can include configuration state, orchestration state, or both depending on the implementation of the gatekeeper. For example, gatekeeper 145 that is limited to performing orchestration of PIM rather than configuration and orchestration (such as the memory controller 140), performs a context of only the orchestration state. Such orchestration state, for example, can include contents of the register file 118. In implementations in which the gatekeeper 145 does not perform configuration, only registered PIM processes that share the same configuration context (the same set of PIM instructions in the LIS 122, for example), can be switched. A PIM memory request received by the memory controller 140 operating as a gatekeeper 145 from a registered PIM process that does not share the active PIM process's configuration context, will fail. In some implementations, described below in greater detail, the gatekeeper 145 performs both configuration and orchestration. In such implementations, the gatekeeper performs a context switch of configuration context as well as orchestration context.

The context switch need not occur immediately upon receive of a memory request from a registered PIM process that is not the active PIM process. Rather, in some implementations, such memory requests are queued by the gatekeeper 145 until various criteria are met. For example, the gatekeeper in on some implementations queues a predefined number of requests for a particular process before initiating the context switch. In other examples, the gatekeeper queues the memory requests until a predefined period of time or number of cycles expires. In another example, the gatekeeper queues memory requests from non-active registered PIM processes until the active registered PIM process completes a kernel of PIM instructions.

After the context switch is complete, the gatekeeper then issues the PIM command of the requesting process (now the active PIM process) to the PIM device. The gatekeeper 145 ensures that only a registered process can access a PIM device and that only a single process is actively utilizing the PIM device at a time. In this way, the gatekeeper ensures functional correctness and security of the PIM device.

Readers of skill in the art will recognize that the gatekeeper can process non-PIM memory requests concurrently with memory requests that include a PIM command. That is, the gatekeeper only performs the determination of whether the requesting process is a registered PIM process if the memory request is a PIM memory request rather than a non-PIM read or write.

Figure 2:
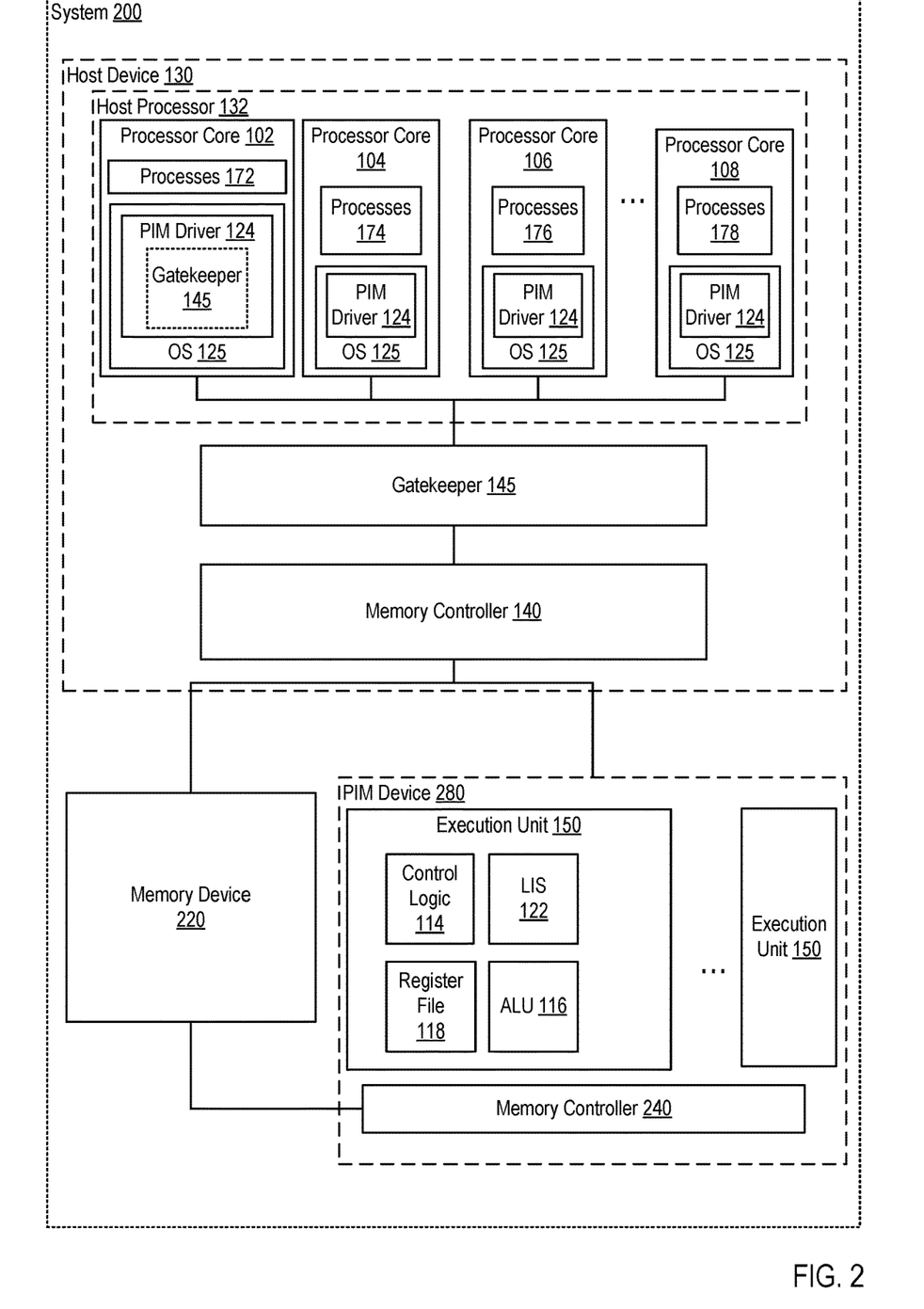
FIG. 2 sets forth a block diagram of an example system 200 for supporting multiprocessing with PIM in accordance with the present disclosure.

For further explanation, FIG. 2 sets forth a block diagram of an example system 200 for supporting multiprocessing with PIM in accordance with the present disclosure. The example system 200 of FIG. 2 includes many of the same components of system 100 of FIG. 1.

In the example of FIG. 2, the execution unit 150 is a component of a PIM device 280 that is implemented in a processing-near-memory (PNM) fashion. For example, the PIM device 280 can be a memory accelerator that is used to execute memory-intensive operations that have been offloaded to by the host processor 132 to the accelerator. The host processor 132 and the PIM device 280 are both coupled to the same memory 220. The host processor 132 provides PIM instructions to the PIM device 280 through the memory controller 140, which the execution unit 150 of the PIM device 280 performs on data stored in the memory 220. Thus, the PIM device 280 is "near" memory in that the execution unit 150 is interposed between the memory controller 140 of the host processor 132 and the memory 220. In some examples, the PIM device 280 is coupled to the memory 220 via a memory controller 240, where the memory 220 is not specifically a PIM-enabled memory. In the example of FIG. 2, the execution unit 150 is not implemented within a particular DRAM component (e.g., bank, channel, chip, rank, module, die, etc.) but is closely coupled to the memory 220. For example, the PIM device 280 can be implemented in the interface die of a 3-D stacked memory device or as a separate die.

Also in the example system 200, a gatekeeper 145 is implemented as a component separate from the memory controller 140. An example of such a gatekeeper can be a PIM agent implemented as a microcontroller that is configured to perform both configuration and orchestration of PIM operations on the PIM device 280. In such an implementation, when the gatekeeper performs the aforementioned context switch of PIM state, the gatekeeper 145 stores the contents of the LIS 122, the contents of the register file, and any other state data for one process and reconfigures the execution unit 150 for the requesting PIM process.

As an alternative to the gatekeeper 145 being implemented as logic separate from the memory controller 140, FIG. 2 also shows a gatekeeper 145 implemented as a component of the PIM driver 124. In implementations in which the PIM driver 124 can control what work is launched on the PIM orchestrator (GPU, CPU, or PIM agent), the gatekeeper 145 can perform the aforementioned context switching between registered PIM processes. In addition, non-PIM processes can proceed along in parallel with PIM process execution.

Figure 3A:
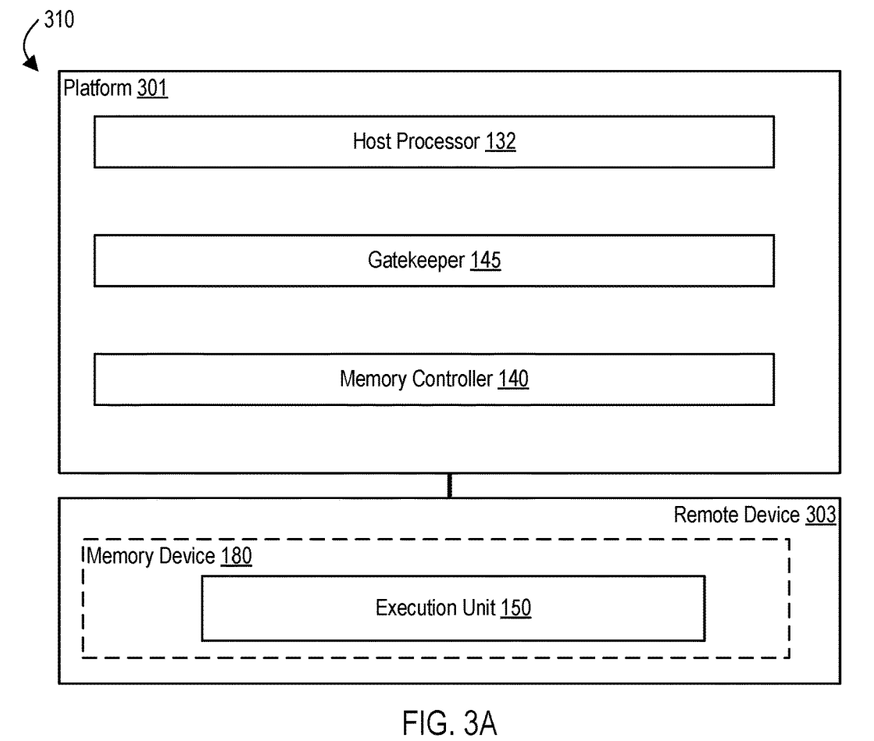
FIG. 3A sets forth a block diagram of an exemplary system configuration 310 for supporting process isolation for a PIM device according to some implementations of the present disclosure.

For further explanation, FIG. 3A sets forth a block diagram of an exemplary system configuration 310 for supporting process isolation for a PIM device according to some implementations of the present disclosure. In the example configuration 310 of FIG. 3A, the memory controller 140, the gatekeeper 145, and the host processor 132 and are implemented in the same System-on-Chip (SoC) platform 301. An execution unit 150 is implemented in a remote device 303. In some examples, the execution unit 150 is a component of a remote memory device 180 (e.g., a PIM-enabled memory device) that is implemented in the same package as the SoC platform 301.

Figure 3B:
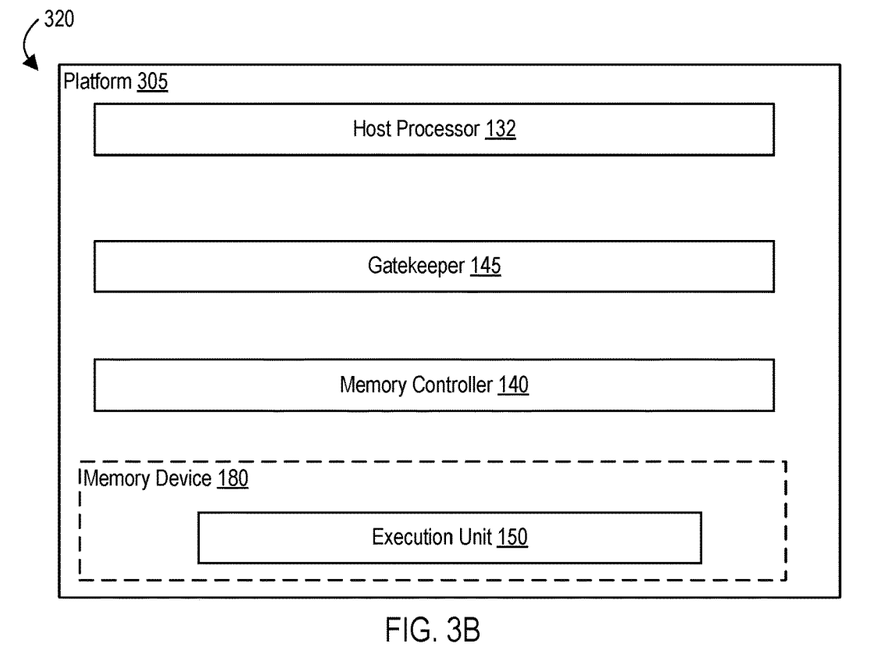
FIG. 3B sets forth another block diagram of an exemplary system configuration 310 for supporting process isolation for a PIM device according to some implementations of the present disclosure.

For further explanation, FIG. 3B sets forth another block diagram of an exemplary system configuration 310 for supporting process isolation for a PIM device according to some implementations of the present disclosure. In the example configuration 320 of FIG. 3B, the execution unit 150, the memory controller 140, the gatekeeper 145, and the host processor 132 are implemented on the same SoC platform 305. In some examples, the execution unit 150 is a PIM unit of memory device 180 (e.g., a PIM-enabled memory device) that is also implemented on the same SoC platform 305. Although the execution unit 150 is implemented on the same SoC platform 305 as the host processor 132, it is noted that the execution unit 150 is considered to be external to the host processor 132 in that logic circuitry that implements the execution unit 150 is external to logic circuitry that implements any processor core of the host processor 132.

Figure 4:
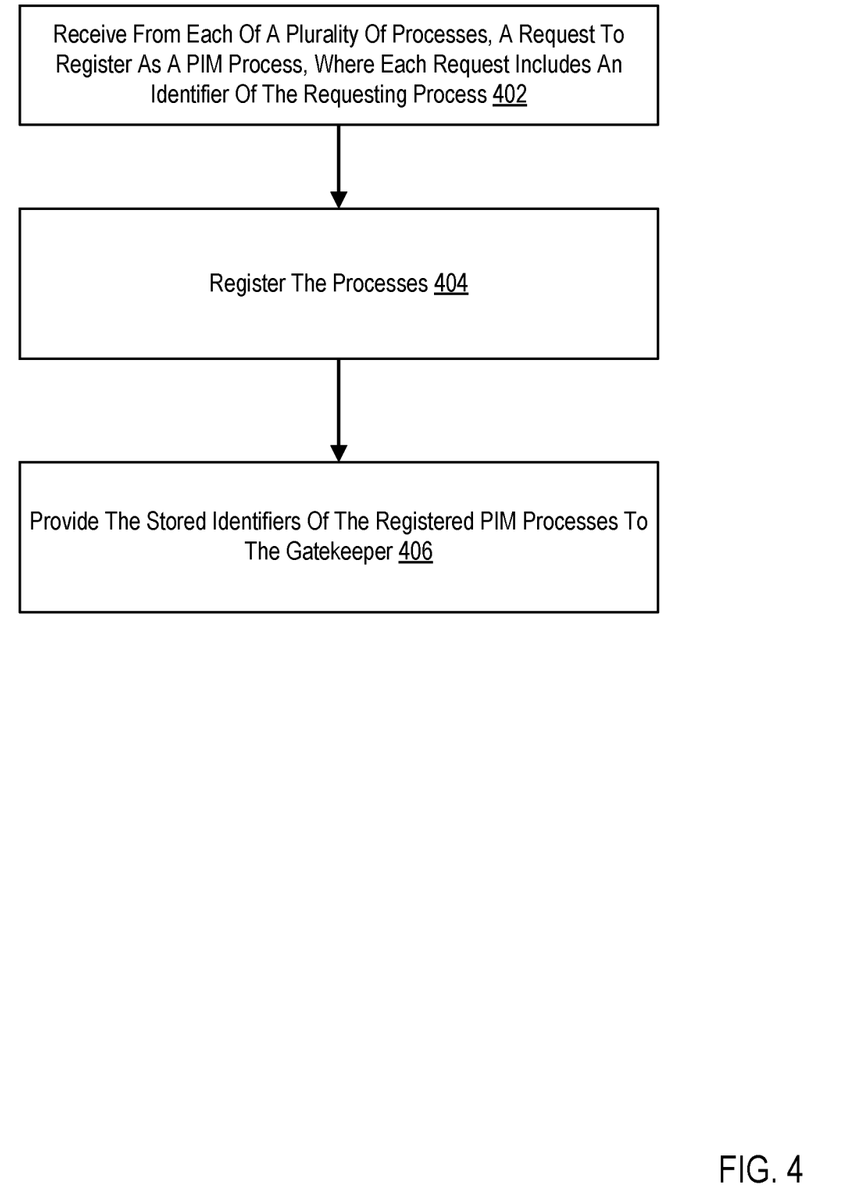
FIG. 4 sets forth a flow chart illustrating an example method of registering a process as a PIM process according to some implementations of the present disclosure.

For further explanation, FIG. 4 sets forth a flow chart illustrating an example method of registering a process as a PIM process according to some implementations of the present disclosure. The method of FIG. 4 is carried out by a PIM driver. The method of FIG. 4 includes receiving 402, from each of a plurality of processes, a request to register as a PIM process. Each request includes an identifier of the requesting process. The PIM driver receives such a request through a driver call made by the process.

The method of FIG. 4 also includes registering 404 the processes. Registering processes as PIM processes includes storing the received identifiers in a data structure such as a table or in a register file. A process can request registration upon instantiation of the process or upon initiation of a PIM kernel in the process's code among other times.

The method of FIG. 4 also includes providing 406 the stored identifiers of the registered PIM processes to a gatekeeper. The PIM driver can provide the stored identifiers to a gatekeeper in a number of ways. In an implementation, the PIM driver provides the stored identifiers by storing copying the data structure into the gatekeeper's local memory. Once the gatekeeper has possession of the registered PIM process IDs, the gatekeeper can manage access to the PIM device.

Figure 5:
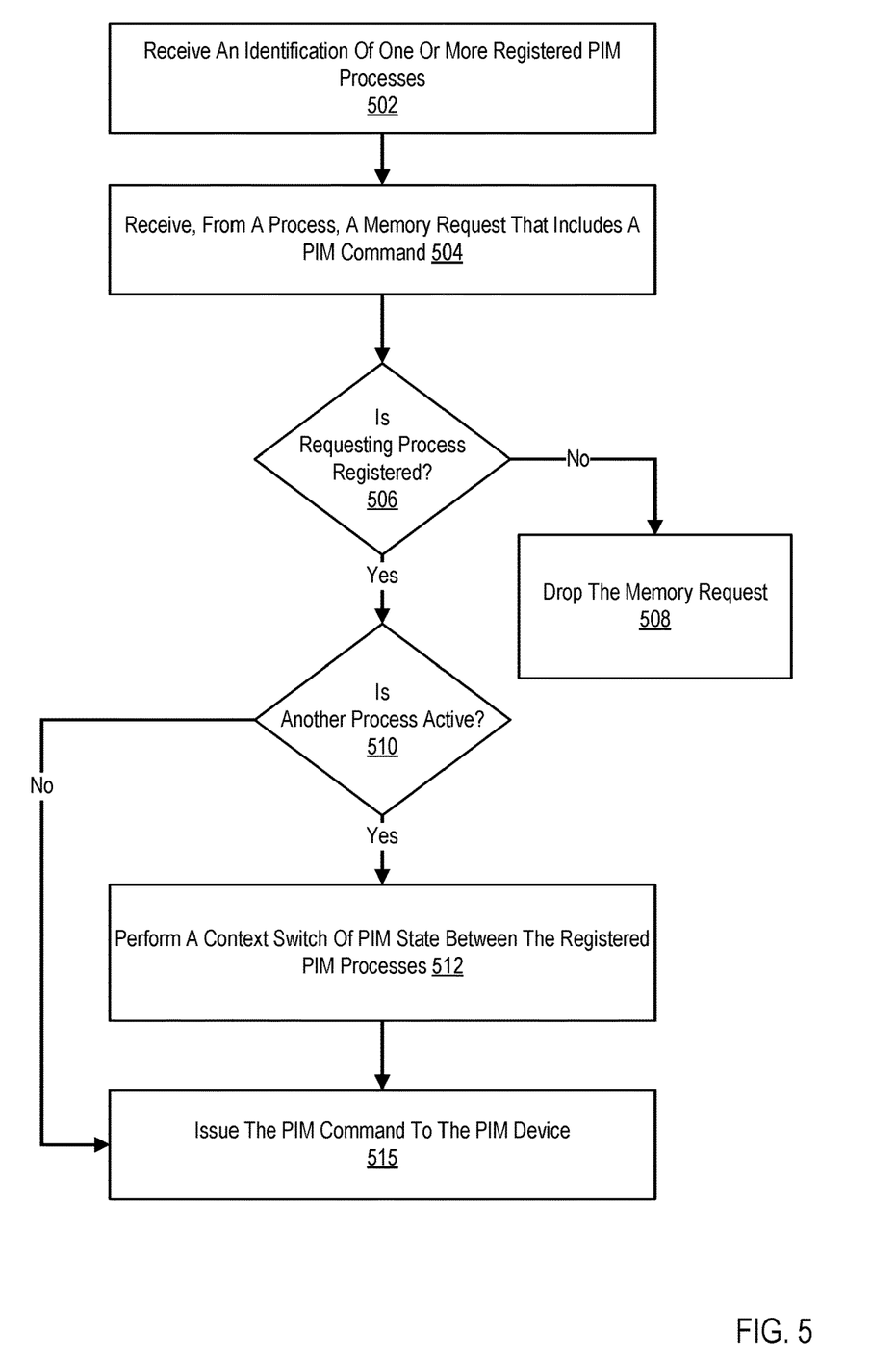
FIG. 5 sets forth a flow chart illustrating an example method of managing multi-process execution in a PIM device according to some implementations of the present disclosure.

To that end, the method of FIG. 5 sets forth a flow chart illustrating an example method of managing multi-process execution in a PIM device according to some implementations of the present disclosure. The method of FIG. 5 is carried out by a gatekeeper. The method of FIG. 5 includes receiving 502 the identification of one or more registered PIM processes as described above with respect to FIG. 4.

The method of FIG. 5 also includes receiving 504, from a process, a memory request that includes a PIM command. The memory request is encoded with an identification of the requesting process. The gatekeeper then determines 506 whether the requesting process is a registered PIM process by comparing the PID encoded in the memory request with the PIDs stored as registered PIM PIDs.

If the requesting process is not a registered PIM process, the gatekeeper drops 508 the memory request. That is, the gatekeeper blocks any requests from malicious or poorly behaving processes through utilization of the registered PIDs.

If the requesting process is a registered PIM process, the gatekeeper then determines 510 whether another process is active on the PIM device. If the requesting process is the active PIM process, the gatekeeper issues 515 the PIM command of the memory request to the PIM device without performing a context switch of PIM state. If another process is the active PIM process and another registered PIM process is active on the PIM device, the gatekeeper performs 512 a context switch of PIM state between the registered PIM processes and then issues 515 the PIM command of the memory request of the requesting process to the PIM device. As part of the context switch, the gatekeeper also updates the active PIM process to be the requesting process's process ID.

As mentioned above, the context switch need not occur immediately upon receiving a PIM memory request from a registered PIM process that is not the active PIM process. To that end, FIG. 6 sets forth a flow chart illustrating an example method of performing a context switch of the PIM state between registered processes in which various requests are queued.

Figure 6:
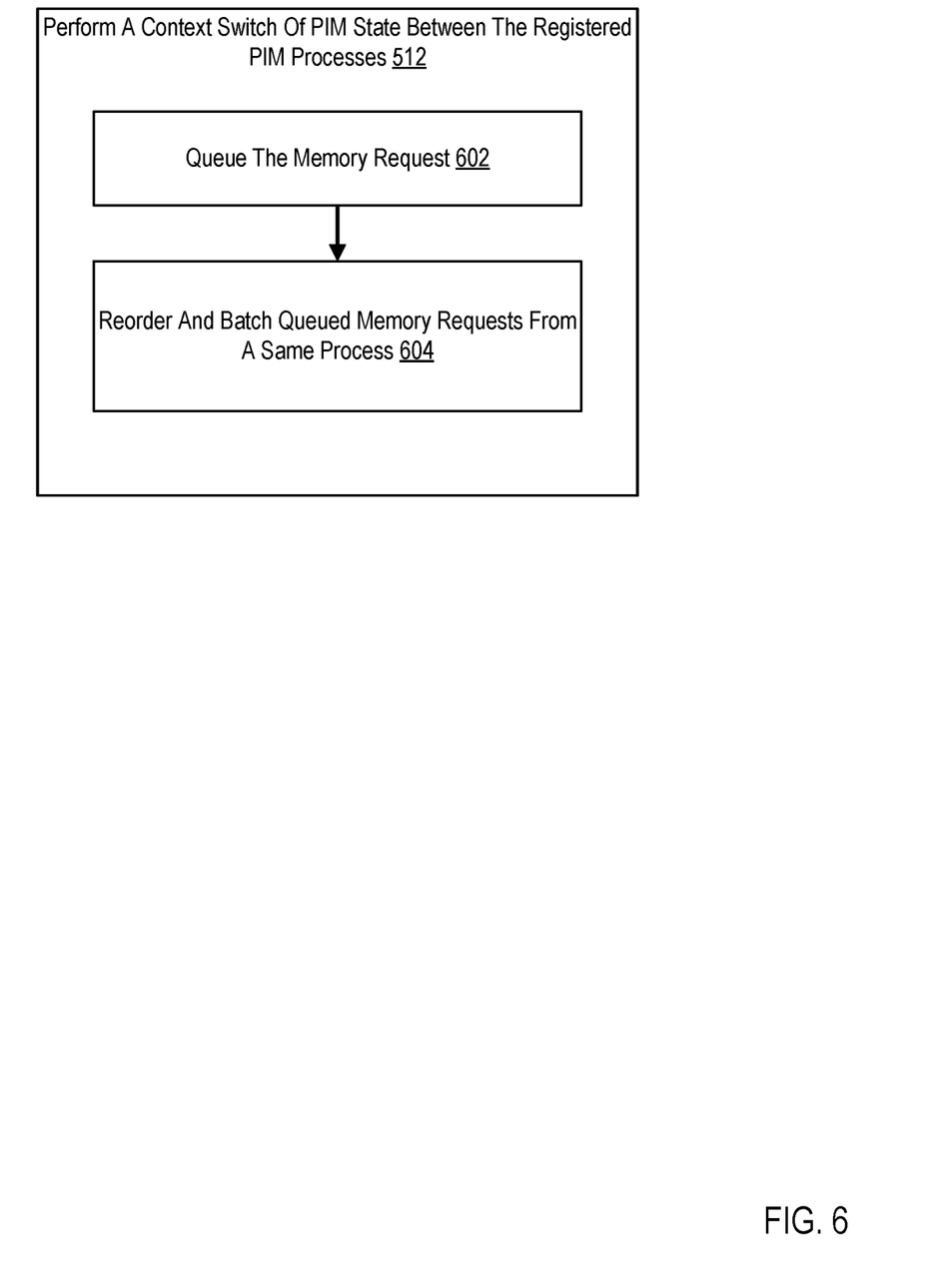
FIG. 6 sets forth a flow chart illustrating an example method of performing a context switch of the PIM state between registered processes in which various requests are queued.

In the method of FIG. 6, performing the context switch includes queueing 602 the memory request of the requesting process. The gatekeeper can be configured to queue any number of requests from any number of registered PIM processes that are not currently active on the PIM device. This queuing reduces context switching overhead. The switching can be initiated at various times and for various reasons. In some examples, the gatekeeper queues memory requests for a predefined period of time before performing the context switch. In some examples, the gatekeeper queues memory requests until the number of memory requests queued for a particular process reaches a predefined threshold.

The method of FIG. 6 also includes reordering 604 and batching queued memory requests from a same process prior to performing the context switch. A gatekeeper, in some implementations, can reorder, merge, and batch memory requests for increased efficiency and reduced context switching overhead. A size of a PIM request batch can be set via a control register of the gatekeeper. That is, the batch size can be user specified.

Implementations can be a system, an apparatus, a method, and/or logic. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) can execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. An apparatus configured for managing multi-process execution in a processing-in-memory (PIM) device, the apparatus comprising a memory controller, the memory controller comprising logic configured to:
   receive, from a first process, a memory request that includes a PIM command;
   perform a context switch of a PIM state based on the first process being a registered PIM process and a second process being a registered PIM process and being active on the PIM device; and
   issue the PIM command of the first process to the PIM device.

2. The apparatus of claim 1, wherein the memory controller further comprises logic configured to:
   if the first process is a registered PIM process and the first process is active on the PIM device, issue the PIM command to the PIM device, without performing a context switch of the PIM state.

3. The apparatus of claim 1, wherein the memory controller further comprises logic configured to:
   drop the memory request if the first process is not a registered PIM process.

4. The apparatus of claim 1, wherein the memory controller further comprises logic configured to:
   queue the memory request prior to performing the context switch of the PIM state.

5. The apparatus of claim 4, wherein the memory controller queues the memory request for a predefined period of time before performing the context switch.

6. The apparatus of claim 5, wherein the memory controller further comprises logic to reorder and batch queued memory requests from a same process prior to performing the context switch.

7. The apparatus of claim 1, wherein:
   the memory request is encoded with an identification of the first process; and
   the memory controller further comprises logic configured to determine, based on the identification of the first process, whether another registered PIM process is active on the PIM device.

8. The apparatus of claim 1, wherein the memory controller is further configured to process non-PIM memory requests concurrently with memory requests that include a PIM command.

9. The apparatus of claim 1, wherein the memory controller further comprises logic to:
receive, from a PIM Driver, identifiers of registered PIM processes; and
store the identifiers of the registered PIM processes.

10. A method of managing multi-process execution in a processing-in-memory (PIM) device, method comprising:
receiving, from a first process, a memory request that includes a PIM command;
performing a context switch of a PIM state based on the first process being a registered PIM process and a second process being a registered PIM process and being active on the PIM device; and
issuing the PIM command of the first process to the PIM device.

11. The method of claim 10, further comprising:
if the first process is a registered PIM process and the first process is active on the PIM device, issuing the PIM command to the PIM device, without performing a context switch of the PIM state.

12. The method of claim 11, further comprising:
dropping the memory request if the first process is not a registered PIM process.

13. The method of claim 11, further comprising:
queuing the memory request prior to performing the context switch of the PIM state.

14. The method of claim 11, wherein the memory request is queued for a predefined period of time before performing the context switch.

15. The method of claim 14, wherein queued memory requests of a same process are reordered and batched prior to performing the context switch.

16. The method of claim 10, wherein the memory request is encoded with an identification of the first process and the method further comprises determining, based on the identification of the first process encoded in the memory request, whether another registered PIM process is active on the PIM device.

17. A computer program product comprising a non-transitory computer readable medium, wherein the medium includes instructions that when executed by a processor core:
receive, from a first process, a memory request that includes a processing-in-memory (PIM) command;
perform a context switch of a PIM state based on the first process being a registered PIM process and a second process being a registered PIM process and being active on a PIM device; and
issue a PIM command of the first process to the PIM device.

18. The computer program product of claim 17, wherein the instructions, when executed by the processor core:
drop the memory request if the first process is not a registered PIM process.

19. The computer program product of claim 17, wherein the instructions, when executed by the processor core:
issue the PIM command to the PIM device without performing a context switch of the PIM state if the first process is a registered PIM process and the first process is active on the PIM device.

20. The computer program product of claim 17, wherein the instructions, when executed by the processor core:
queue the memory request prior to performing the context switch of the PIM state.

* * * * *